United States Patent [19]

Stosel et al.

[11] Patent Number: 5,794,733
[45] Date of Patent: Aug. 18, 1998

[54] VEHICLE AIR INTAKE AND METHOD

[75] Inventors: Dennis E. Stosel, Kernersville; Thomas J. Palenchar, Greensboro, both of N.C.

[73] Assignee: Volvo GM Heavy Truck Corporation, Greensboro, N.C.

[21] Appl. No.: 698,853

[22] Filed: Aug. 16, 1996

[51] Int. Cl.[6] .................................................. B60K 11/00
[52] U.S. Cl. ........................ 180/68.1; 180/68.3; 180/69.25
[58] Field of Search ............................ 180/68.3, 69.25, 180/69.24, 68.4, 68.1

[56] References Cited

U.S. PATENT DOCUMENTS

| | | |
|---|---|---|
| 1,855,038 | 4/1932 | Walker . |
| 1,863,015 | 6/1932 | Kamrath . |
| 3,232,368 | 2/1966 | Sullivan . |
| 4,133,547 | 1/1979 | Fox . |
| 4,157,902 | 6/1979 | Tokar . |
| 4,159,899 | 7/1979 | Deschenes . |
| 4,208,197 | 6/1980 | Yakimowich et al. . |
| 4,212,659 | 7/1980 | Magrubu . |
| 4,440,555 | 4/1984 | Chichester . |
| 4,454,926 | 6/1984 | Akins . |
| 4,516,650 | 5/1985 | Yamaguchi et al. . |
| 4,575,128 | 3/1986 | Sundquist . |
| 4,606,422 | 8/1986 | Jewett . |
| 4,646,864 | 3/1987 | Racchi . |
| 4,681,178 | 7/1987 | Brown . |
| 4,689,060 | 8/1987 | Koske . |
| 4,862,981 | 9/1989 | Fujikawa et al. .............. 180/68.4 |
| 4,878,555 | 11/1989 | Yasunaga et al. . |
| 4,917,202 | 4/1990 | Glover, Jr. et al. . |
| 4,932,490 | 6/1990 | Dewey . |
| 4,969,533 | 11/1990 | Holm et al. .............. 180/273 |
| 4,971,172 | 11/1990 | Hoffman et al. . |
| 5,022,479 | 6/1991 | Kiser et al. . |
| 5,034,036 | 7/1991 | Creek et al. . |
| 5,120,344 | 6/1992 | Cooper . |
| 5,152,365 | 10/1992 | Aoshima . |
| 5,174,258 | 12/1992 | Tanaka . |
| 5,195,484 | 3/1993 | Knapp . |
| 5,579,858 | 12/1996 | Petersen et al. .............. 180/68.3 |
| 5,618,323 | 4/1997 | Shearn et al. .............. 55/385.3 |

OTHER PUBLICATIONS

"Testing Tomorrow's Technology", by Jim Jones, Des/Dec. 1990.

"International Design & Engineering Assessment", by Navistar International Corporation, Chicago, IL 60611.

*Primary Examiner*—Brian L. Johnson
*Assistant Examiner*—Bridget Avery
*Attorney, Agent, or Firm*—Watts, Hoffmann, Fisher & Heinke Co., L.P.A.

[57] ABSTRACT

An over the highway truck or tractor vehicle with an improved air intake system. The vehicle includes a hood and fender assembly with a smooth outer surface with an air intake opening in the passenger side of the hood. The intake is defined by a perimetral hood flange extending inwardly from the outer surface. A self securing grating is in the opening. The grating has a perimetral gasket recess which traps a gasket in engagement with the hood flange to provide water seal around the opening. The grating has baffle portions which delineate air intake passages. Structure within the hood delineates an air flow and water separation passage extending from the intake passages to an engine. The flow and separation passage includes a plenum section adjacent the grating and a choke section above the plenum section.

20 Claims, 4 Drawing Sheets

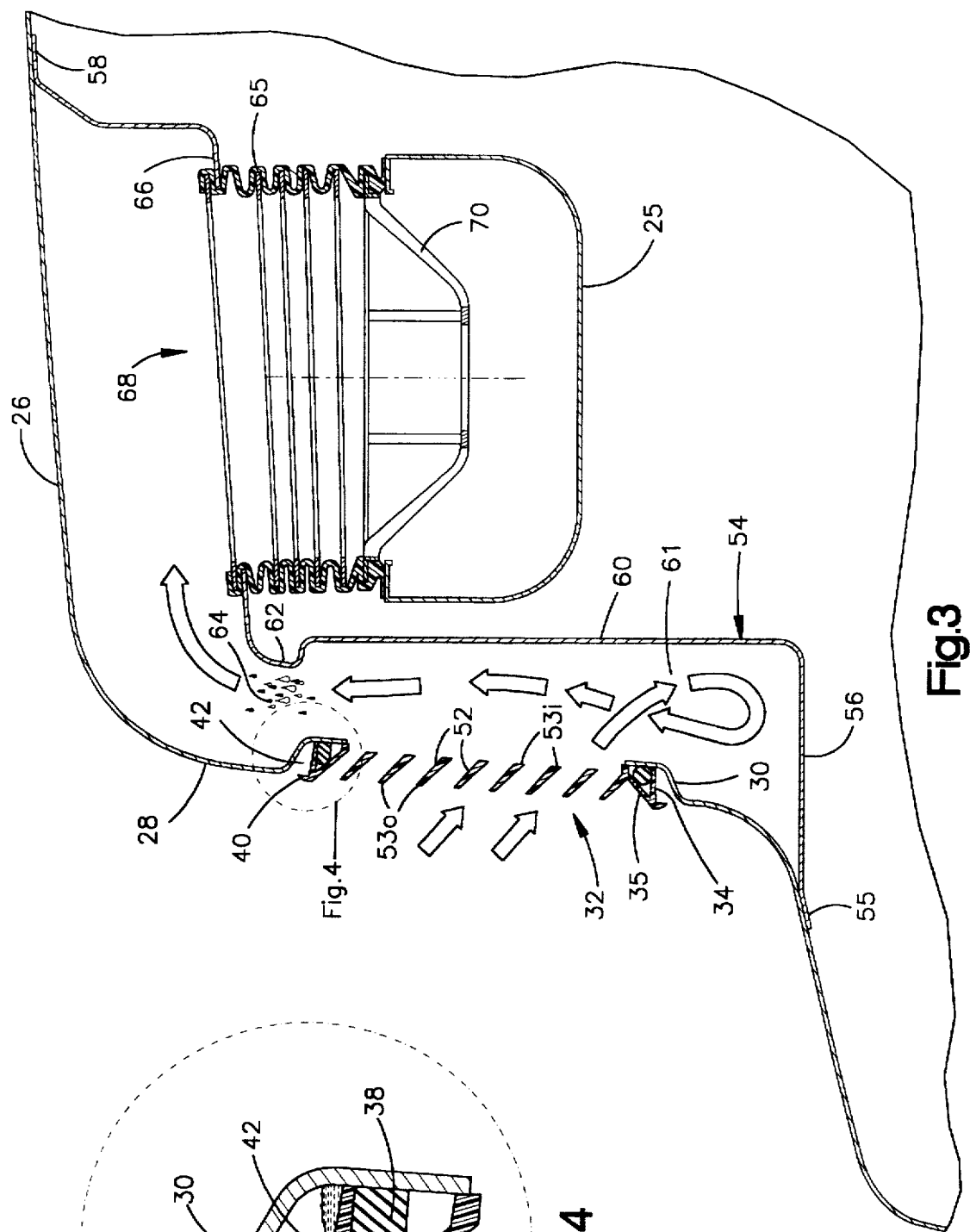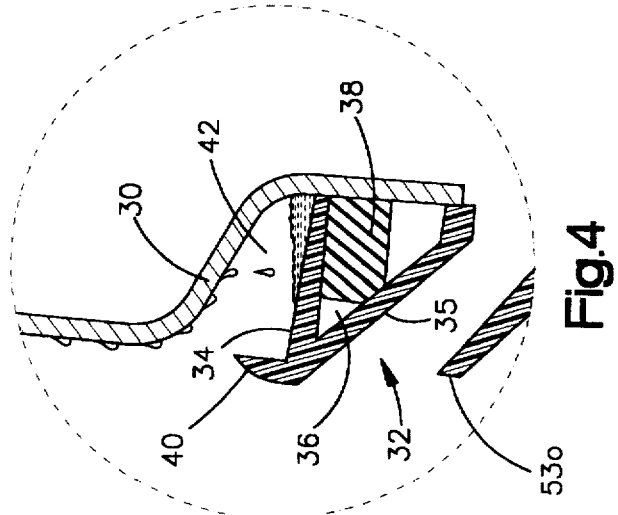

VEHICLE AIR INTAKE AND METHOD

This invention relates to conventional over the highway trucks and tractors and more particularly to an intake system for engine combustion air and a method for delivering combustion air to an engine.

BACKGROUND OF THE INVENTION

In over the highway trucks and tractors, a long standing practice has been to provide a conduit system to deliver fresh air from outside an engine compartment to the engine for combustion. Over the years the systems utilized have varied. For many years a relatively standard practice was to mount an air filter on the passenger side exterior of a vehicle cowl. Such an external air filter was coupled to the engine's intake manifold by a suitable conduit system. For a variety of reasons, not the least of which was an increasing demand for economy of operation, such external air filters are no longer used for new vehicles, at least for long distance haul vehicles. Rather, air is drawn through intakes which are typically immediately forward of and beneath a vehicle's windshield in either the cowl or the hood of the vehicle. Such a location has generally been considered to be the preferred location because it has minimal effects on air flow past a moving vehicle and because it is in a region of high pressure when the vehicle is in over the highway operation.

While such cowl or hood intakes have been generally accepted as appropriate for over the highway vehicles, they are not without disadvantages. A major disadvantage is that under some circumstances excessive amounts of water are entrained in the intake air which can result in engine malfunction and even damage. As an example of one such circumstance, gravel trucks following loading are ofttimes driven through a mechanism known as a gravel washer which floods the vehicle and more importantly its load of gravel for the purpose of flushing entrained dirt and sand from the gravel.

Even though one manufacturer produced a prototype conventional highway tractor with an air inlet through a side of its hood, prior to a vehicle embodying the present invention, it was standard practice to provide such cowl or hood intakes on Class 8 over the highway trucks and tractors used in the United States.

Certain vehicles manufactured by the assignee of this patent have each included a relatively large volume chamber or plenum within and adjacent the top of a hood. Such a plenum receives air through a hood intake positioned near the cowl and centrally of, transversely speaking, the vehicle. The plenum functions to reduce the velocity of intake air. Air passes from the plenum laterally through an air intake passage restriction where the velocity head is, at least to some extent, restored with an accompanying pressure drop. This construction has resulted in the discovery of a phenomena. Specifically the described construction results in a separation of entrained water from the air as the air passes through the restriction, leaving the separated water in the plenum. A large flapper valve was provided in the back of the plenum to allow water to drain out. Under some circumstances, such as flooding from a gravel washer, this flapper valve simply could not handle the volume of water collected with the result that water entered the engine along with combustion air.

Accordingly, it would be desirable to provide an engine air intake system which would provide an ample supply of air free of entrained water while minimizing resistance to the free flow of intake air.

SUMMARY OF THE INVENTION

An over the highway truck or tractor made in accordance with the present invention is a so called "conventional" truck with a forwardly tilting hood and fender assembly. The hood, on its passenger side, has an air inlet opening. A self securing grating is fitted in the opening to provide air intake passages communicating with the vehicle's engine air filter and its engine.

The grating has an endless flange surrounding the intake passages. An outwardly projecting perimetral skirt circumscribes and projects from an outer part of the grating flange. The perimetral skirt, the flange and a hood recessed flange portion, together define a water entrapment recess surrounding the grating and disposed essentially completely within the contour generated by the passenger side of the hood. This recess functions to accept and divert surface water passing along the hood during, for example, vehicle operation in a rain.

An endless intake skirt projects inwardly from the grating flange outerpart to delineate the perimeter of the intakes passages. The intake skirt and grating flange together define a gasket receiving groove. A gasket positioned in the groove coacts with the hood recessed flange portion to effect a perimetral seal around the intake passages substantially to prevent the surface water in the entrapment recess from being entrained in the combustion air.

The grating flange has a base part and a forward surface part projecting upwardly and rearwardly from the base part. Depending on air flow conditions, this forward part either diverts hood surface water causing it to flow downwardly toward the base of the recess or diverts water up and over the grating under the influence of a flow of air entering the recess.

The grating includes baffles that each slope downwardly from a forward end joining the intake skirt to a rearward end attached to an opposite part of the intake skirt. The baffles also each taper inwardly from an upper and outer side edge to a lower and inner side edge. The baffles function to block rain and splashed water from entry into the air flow path. Adjacent baffles define sides of the grating intake passages.

A conduit wall is within the hood and generally vertical when the vehicle is in operation. The conduit wall functions to divert intake air flow upwardly while any water which may be entrained in the air tends to hit the wall and flow downwardly. A gutter with fore and aft drains is below the space between the wall and the grating to receive separated water and divert it through either of the drains outwardly of the engine compartment.

The conduit wall, the hood side and interconnecting end structures delineate a space between the wall and the hood. This space is a large plenum chamber able significantly to reduce the velocity of intake air. The wall and the hood define an outlet choke at the top of the plenum. The choke has the effect of increasing the velocity of air flowing from the plenum through it while decreasing the pressure of the flowing air. The choke utilizes and improves the previously recognized and describe phenomena which enhances separation of entrained water from the flow of the air. With the improved choke, as air moves upwardly from the plenum through the choke, which (unlike the prior vehicles) is above the plenum, gravity enhances separation of water as the velocity head of intake air is restored. The separated water is collected in the gutter and drained outwardly through its drains.

A tubular boot defines a portion of a conduit section between the choke and the air filter. The boot is preferably corrugated in cross section and of a rubber or rubber like material. The boot is effective to perfect a seal between conduit structure connected to the hood and an engine air intake. The boot is separable from a selected one of the structure and the engine air intake to allow the hood to be moved from its normal closed operating position to a forwardly pivoted engine exposed position for service.

Accordingly, the objects of the invention are to provide a novel and improved air intake system for an over the highway truck or tractor, a grating for such system and a method of separating entrained water from air in an engine air intake system.

IN THE DRAWINGS

FIG. 3 is an enlarged sectional view of the intake system as seen from the plane indicated by the line 3—3 of FIG. 2;

FIG. 4 is a further enlarged view showing a detail of a portion of the intake system of FIG. 3;

DETAILED DESCRIPTION OF THE PREFERRED EMBODIMENT

Figure 1:
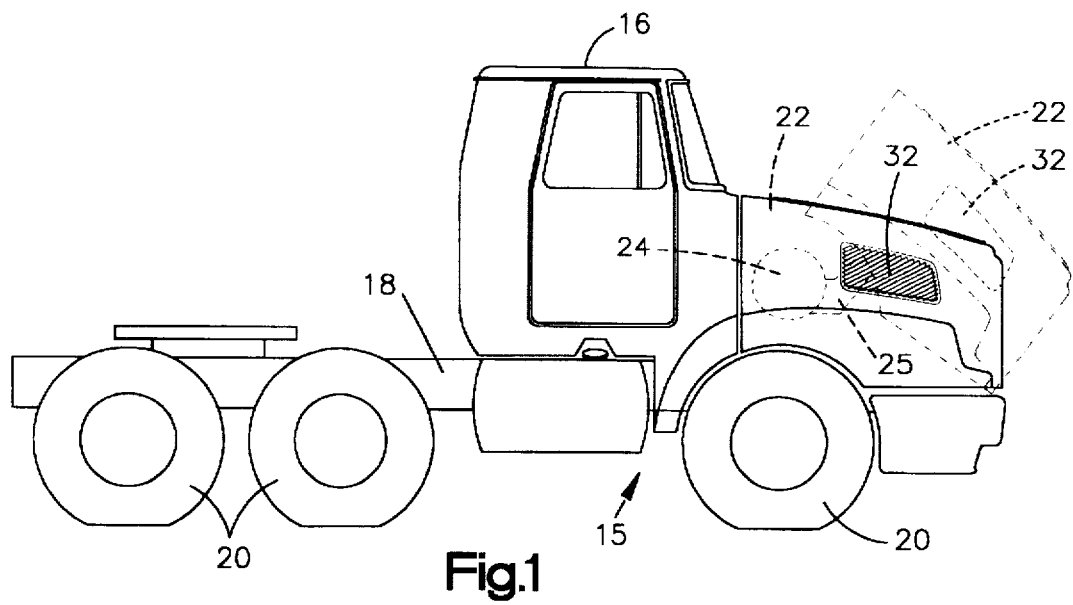
FIG. 1 is a somewhat schematic elevational view of a conventional truck embodying this invention.

Referring to the drawings and to FIG. 1 in particular, a conventional over the highway tractor is shown generally at 15. The tractor includes the usual operator's cab 16 supported by a frame 18. The cab and frame are in turn supported by the usual road wheels 20.

A forwardly tiltable hood and fender assembly 22 is shown in its closed operating position in FIG. 1. For clarity of illustration, the only under the hood components shown in dotted lines are an air filter 24 and its associated air intake conduit 25.

Figure 2:
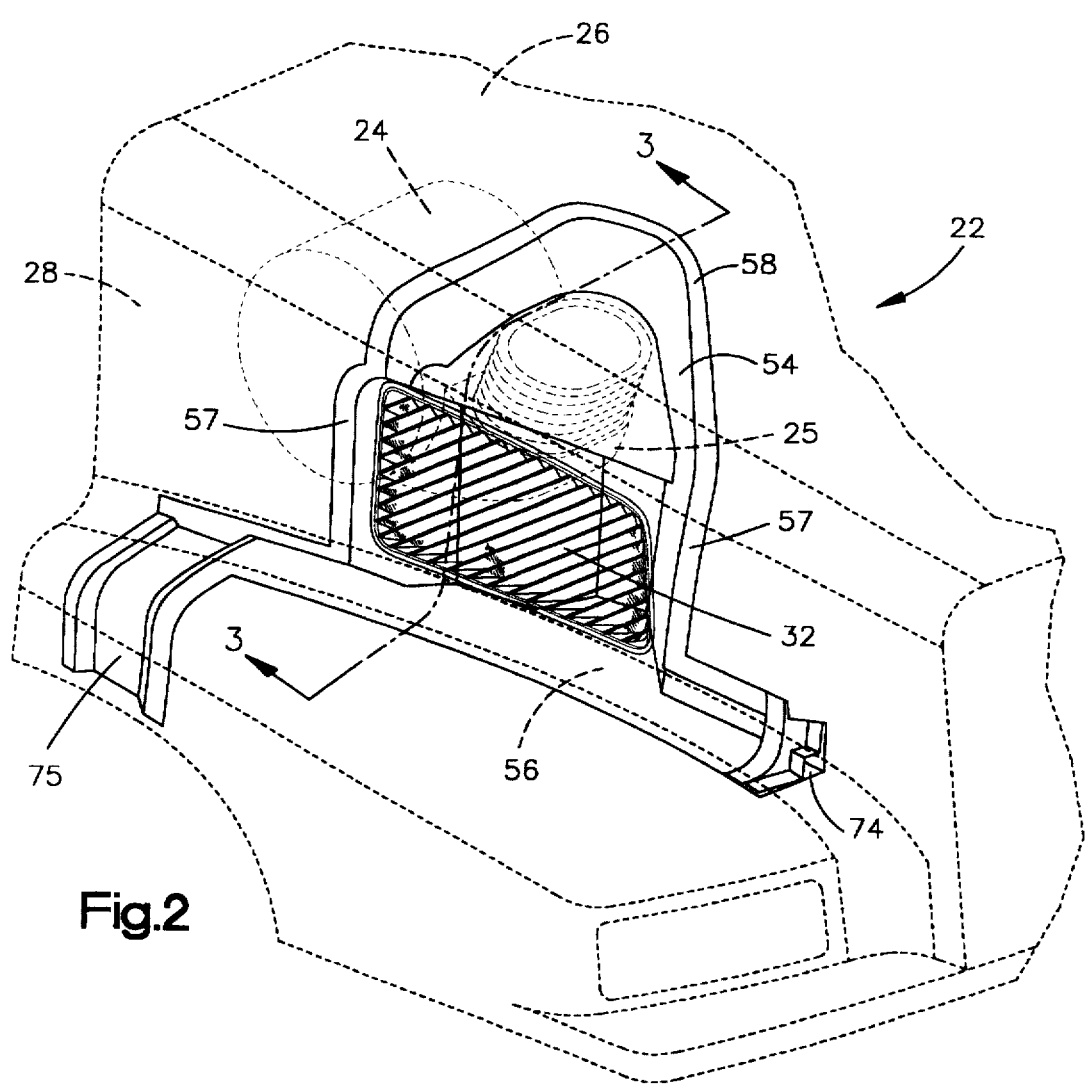
FIG. 2 is a somewhat schematic, perspective view on an enlarged scale with respect to FIG. 1 of the hood and fender assembly and air intake system of this invention.

Referring now to other of the drawings and to FIGS. 2 and 3 in particular, the hood and fender assembly 22 includes a hood top section 26 which is generally horizontal in transverse cross section and a generally vertical hood passenger's side section 28. The hood driver's side section 28 includes an inturned flange 30 delineating the perimeter of a hood inlet opening, see FIGS. 3 and 4. A grating 32 is disposed within the hood inlet opening. The grating is a unitary injection molded part preferably of a Polycarbonate/ABS blend.

The grating 32 includes an endless perimetral flange 34. An endless skirt 35 flares inwardly from an outer part of the grating flange 34. As best seen in FIG. 4 the grating flange and skirt 34,35 together define a gasket receiving recess 36. A gasket 38 in the form of an endless o-ring of rectangular cross section is positioned in the recess 36. The gasket 38 coacts with the hood and grating flanges 30,34 and the skirt 35 to form a perimetral seal around the hood air intake opening.

The grating 32 includes a perimetral projection 40 extending from an outer portion of the flange 34 oppositely from the skirt. The perimetral projection 40 generally lies in the contour generated by the hood driver's side section 28. As is best seen in FIG. 3 and 4, the hood and grating flanges 30,34 and the perimetral projection 40 define an endless surface water collection recess 42 surrounding the grating flange.

Figure 8:
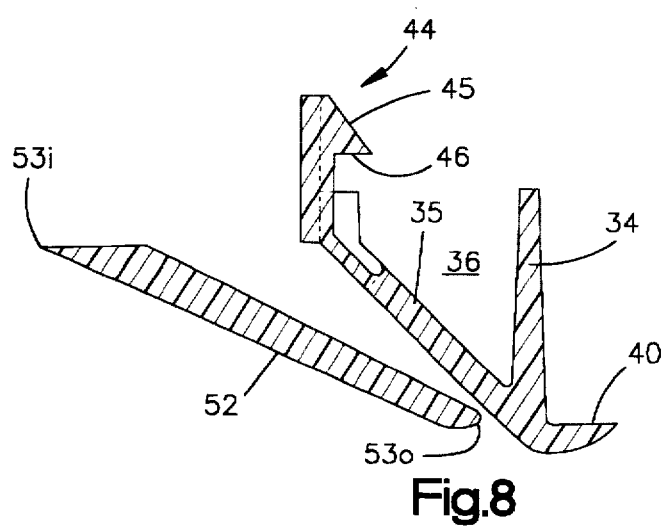
FIG. 8 is an enlarged sectional view of a portion of the grating as seen from the plane indicated by the line 8—8 of FIG. 7.
Figure 9:
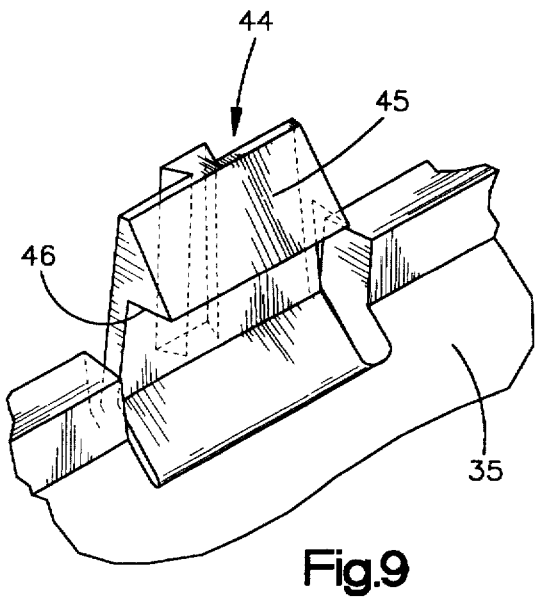
FIG. 9 is an enlarged perspective view of a fragmentary portion of the grating showing one of its integral clips; and, FIG. 10 is a plan view of the fragmentary portion of the grating shown in FIG. 9.
Figure 10:
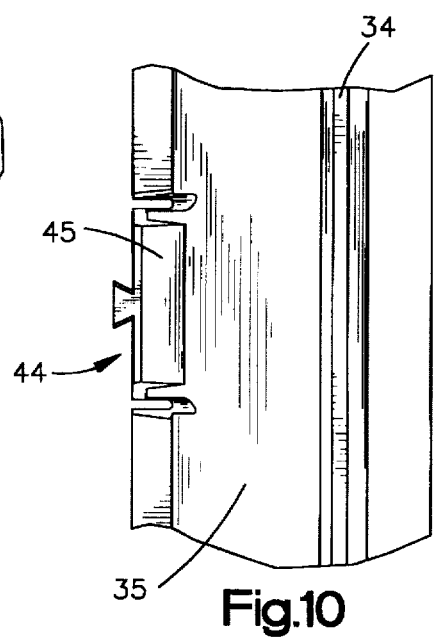

Referring now to FIGS. 5–10, it will be seen that the grating 32 is an integrally molded plastic part. The grating 32 includes a plurality of grating registration and locking clips 44. As is best seen in FIG. 8–10 each of the locking clips includes a cam surface 45 which coacts against the inner perimeter of the hood flange 30 when the grating is inserted in the hood air intake aperture. The action of the cam surfaces 45 as the grating is snapped into the aperture, is to cam each of the clips 44 inwardly until the cam surfaces have passed the flange 30. Once the cam surfaces 45 have passed the flange 30, the inherent resiliency of the clips returns them to their normal positions as shown in the drawings, such that clip lock surfaces 46 overly and engage the hood flange 30 to lock the grating in place and trap the gasket 38 in the gasket recess 36.

Figure 5:
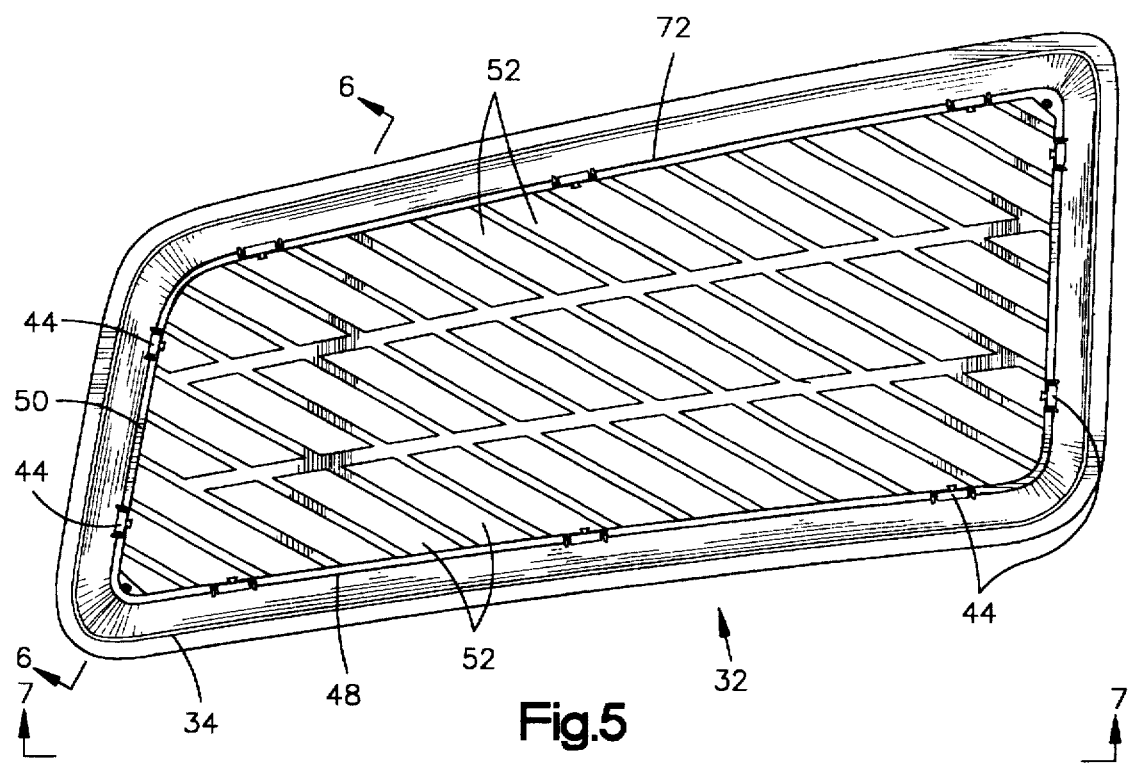
FIG. 5 is an elevational view on the scale of FIG. 3 of the interior side of the intake grating of an intake system of this invention.
Figure 6:
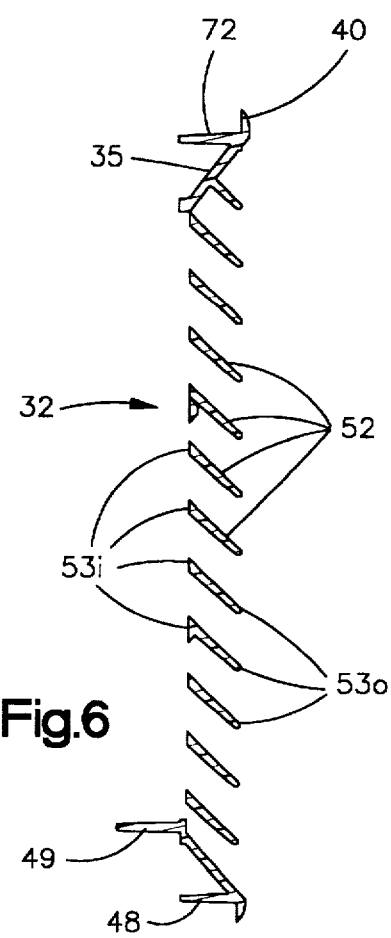
FIG. 6 is a sectional view of the grating as seen from the plane indicated by the line 6—6 of FIG. 5.
Figure 7:
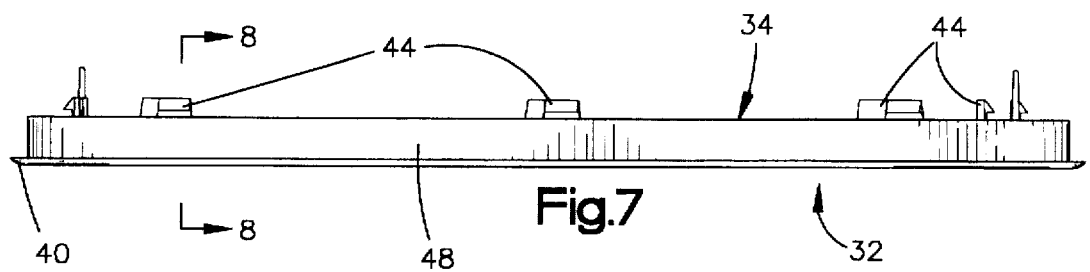
FIG. 7 is a top plan view of the grating of FIG. 5.

As is best seen in FIG. 5, the grating flange 34 includes a generally horizontal base section 48 and a rearwardly sloping front section 50 extending upwardly from the base to the top. Baffles 52 extend across the inlet opening. The baffles are connecting at their ends to the skirt 35, so that each baffle extends from a forward connection downwardly and rearwardly. The baffles also slope inwardly and forwardly from outer to inner edges 53o,53i.

Referring to FIGS. 2 and 3, a conduit section 54 is provided. The conduit section 54 is secured at 55 to the hood and fender assembly 22 immediately below the passenger's side section 28. A lower part of the conduit section 54 forms a trough or gutter 56. The conduit section 54 has fore and aft connections to the hood passenger's side section 28 as shown at 57 in FIG. 2. The conduit section is further connected to the hood top section 26 as indicated at 58 in FIGS. 2 and 3. Thus, the conduit section 54 and the hood and fender assembly 22 are fixed together to define an air inlet conduit within the hood.

Referring to FIG. 3 in particular, the air inlet conduit includes a vertical wall section 60. The wall section 60 is spaced from and aligned with the hood inlet opening such that the hood passenger's side section 28, the wall section 60 and other parts of the conduit section 54 together define an enlarged chamber or plenum 61 into which air from the intake opening flows. The conduit section 54 includes an inturned part 62 aligned with the top part of the hood flange 30 such that the two coact to define a constriction or choke 64 for air flowing from the plenum 61 downstream toward the air filter intake conduit 25.

A corrugated, flexible boot 65 is provided. The boot 65 is secured to a top part 66 of the conduit section 54. The securement of the boot 65 to the top part 66 is around a conduit outlet opening 68 such that the boot communicates air flow between the choke 64 and the air filter inlet conduit 25. A cage 70 is secured in an outlet opening of the boot 65. The cage functions to maintain appropriate perimetral configuration of the boot and to assist in bringing the boot into engagement with the air filter inlet conduit 25 whenever the hood assembly 22 is moved from its open position as shown in phantom in FIG. 1 to a closed and operating position as indicated in solid lines.

OPERATION

Assuming the tractor 15 is traveling at highway speeds in a rainstorm, rain striking the hood 22 along with spray from other vehicles will tend to form a water film on the hood. As the water flows along the passenger's side section 28, some will flow into the water collection recess 42. Once in the recess some of the water will flow downwardly along the flange front section 50 and find its way out of the recess. Other of the water may be blown rearwardly along an upwardly and rearwardly sloping top section of the flange 34.

Air is drawn through the grating as indicated by the arrows in FIG. 3. Water striking the baffles 52 will tend to flow downwardly along them and may flow into the plenum 61 and then drop to the gutter 56. Because of the inward and downward slope of the baffles 52, air flow tends to be directed downwardly as indicated by the arrows causing a somewhat turbulent condition such that water entrained in the air in the plenum will tend to rain out into the gutter 56 or strike the wall 60 and flow down it.

As the air flows upwardly through the choke 64 the air velocity increases and through the earlier described phenomena remaining entrained water tends to rain out as indicated by the droplets shown in the choke in FIG. 3. The water "raining" from the air as it passes the choke also drops into the gutter 56. Water gravity flows from the gutter 56 through front and rear drain openings 74, 75, FIG. 2.

Once the now substantially dry air has passed the choke 64 it flows downwardly through the opening 68, the boot 65 and the cage 70 into the air intake conduit 25.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. In a conventional over the highway truck or tractor vehicle having a forwardly located engine and hood, an improved engine air intake system comprising:
    a) the hood having a generally vertical side portion defining an air inlet;
    b) an apertured grating secured to the hood and positioned in the inlet;
    c) a flow diverting wall mounted within the hood and positioned in a generally vertical orientation when the vehicle is in use;
    d) the wall being spaced from and generally parallel to the inlet to define a part of a relatively large initial portion of an air flow path from the inlet to the engine and to divert upwardly air flowing inwardly from the inlet;
    e) the wall being spaced from an upper part of the hood side portion, the spacing between the wall and the hood upper part being less than the spacing between the wall and the inlet to define a water separating choke in the air flow path above the initial portion, the choke also being an exit from the initial portion whereby to induce water separation from air as the air exits the initial portion; and,
    f) structure providing a conduit delineating a portion of the path, the conduit communicating the choke with the engine.

2. The intake system of claim 1 further including other structure delineating a water collection and disposal trough beneath the initial portion of the path.

3. The system of claim 1 wherein the grating further comprises:
    a) an endless flange surrounding the grating apertures and disposed around the hood inlet;
    b) a perimetral section around the flange and extending outwardly from an outer part of the flange in aligned relationship with a surface of the hood side portion; and,
    c) an endless skirt extending inwardly from the inner circumference of the flange outer part such that in planes of cross section the flange and skirt delineate "v" configurations.

4. The system of claim 3 wherein the grating apertures collectively form an air intake opening and the skirt defines the perimeter of the air intake opening and wherein baffles extend across the air intake opening, each baffle being connected at its ends to the skirt.

5. The system of claim 3 wherein the grating further includes integrally molded clips securing the grating to the hood.

6. The system of claim 3 wherein the flange and skirt define a gasket receiving recess and wherein a gasket is in the recess, the gasket providing a water seal between the grating and the vehicle hood and around the air inlet.

7. In an over the highway conventional truck or tractor an improved air intake system comprising:
    a) a pivotally mounted engine hood having a top and two side portions, the hood portions defining an inverted squared "u" configuration in transverse cross section, the hood being pivotal between closed and engine access positions;
    b) one of the side portions including a smooth outer surface having a through air intake opening, the opening being defined by a perimetral hood flange extending inwardly from the outer surface;
    c) a self securing grating secured in the opening and including flange and skirt recess portions defining a perimetral gasket recess;
    d) a gasket in the recess and in engagement with the hood flange, the gasket providing an endless water seal around the opening;
    e) the grating having outermost surfaces disposed essentially in an imaginary extension of a contour generated by said side portion outer surface;
    f) the grating having baffle portions each having spaced ends connected to one of the recess portions, the baffle portions delineating air intake passages therebetween; and,
    g) structure delineating an air flow and water separation passage extending from the intake passages to an engine, the structure including:
        i) a flow diverting wall spaced from and generally paralleling said one side portion when the hood is in a closed position;
        ii) the wall and the side portion defining an initial portion of the separation passage, the initial portion being in fluid communication with the intake passages;
        iii) the wall being spaced from the hood top portion to define a choke in said air flow passage above and as an exit from the initial portion whereby to induce water separation from air as the air exits the initial portion; and, iv) separable parts defining a section of the air flow passage between the choke and the engine when the hood is in the closed position and being separable to enable movement of the hood from the closed to an engine access position.

8. The system of claim 7 further including a water collection trough beneath a portion of the passage between the grating and the wall.

9. The system of claim 8 wherein the trough has fore and aft outlet drains.

10. The system of claim 7 wherein the grating flange portion is a perimetral flange extending inwardly from the outermost surfaces, the grating and hood flanges being spaced to delineate a water entrapment space circumscribing said water seal.

11. The system of claim 10 wherein the grating flange has a base and a forward section extending upwardly and rearwardly from the base.

12. The system of claim 7 wherein each of the grating baffles slopes downwardly and rearwardly from a forward one of said ends.

13. The system of claim 12 wherein in each of the baffles also slopes inwardly and downwardly from an outer side edge to an inner side edge.

14. The system of claim 7 wherein the separable parts include a flexible tubular boot of corrugated configuration.

15. The system of claim 14 wherein a cage is mounted in an outlet opening of the boot.

16. In a conventional over the highway truck or tractor vehicle having a forwardly located engine and hood, an improved engine air intake system comprising:

a) the hood having a generally vertical side portion defining an air inlet;

b) an apertured grating secured to the hood and positioned in the inlet;

c) a flow diverting wall mounted within the hood and positioned in a generally vertical orientation when the vehicle is in use;

d) the wall being spaced from and generally parallel to the inlet to define a part of a relatively large initial portion of an air flow path from the inlet to the engine and to divert upwardly air flowing inwardly from the inlet;

e) structure providing a conduit delineating a portion of the path, the conduit communicating the initial portion with the engine; and, f) other structure delineating a water collection and disposal trough beneath the initial portion of the path.

17. In an over the highway conventional truck or tractor an improved air intake system comprising:

a) a pivotally mounted engine hood having a top and two side portions, the hood portions defining an inverted squared "u" configuration in transverse cross section, the hood being pivotal between closed and engine access positions;

b) one of the side portions including a smooth outer surface having a through air intake opening, the opening being defined by a perimetral hood flange extending inwardly from the outer surface;

c) a self securing grating secured in the opening and including flange and skirt recess portions defining a perimetral gasket recess;

d) a gasket in the recess and in engagement with the hood flange, the gasket providing an endless water seal around the opening;

e) the grating having outermost surfaces disposed essentially in an imaginary extension of a contour generated by said side portion outer surface;

f) the grating having baffle portions each having spaced ends connected to one of the recess portions, the baffle portions delineating air intake passages therebetween;

g) structure delineating an air flow and water separation passage extending from the intake passages to an engine;

h) the grating flange portion being a perimetral flange extending inwardly from the outermost surfaces, the grating and hood flanges being spaced to delineate a water entrapment space circumscribing said water seal; and, i) the grating flange having a base and a forward section extending upwardly and rearwardly from the base.

18. In an over the highway conventional truck or tractor an improved air intake system comprising:

a) a pivotally mounted engine hood having a top and two side portions, the hood portions defining an inverted squared "u" configuration in transverse cross section, the hood being pivotal between closed and engine access positions;

b) one of the side portions including a smooth outer surface having a through air intake opening, the opening being defined by a perimetral hood flange extending inwardly from the outer surface;

c) a self securing grating secured in the opening and including flange and skirt recess portions defining a perimetral gasket recess;

d) a gasket in the recess and in engagement with the hood flange, the gasket providing an endless water seal around the opening;

e) the grating having outermost surfaces disposed essentially in an imaginary extension of a contour generated by said side portion outer surface;

f) the grating having baffle portions each having spaced ends connected to one of the recess portions, the baffle portions delineating air intake passages therebetween; and, g) structure delineating an air flow and water separation passage extending from the intake passages to an engine; and, h) each of the grating baffles sloping downwardly and rearwardly from a forward one of said ends.

19. The system of claim 18 wherein in each of the baffles also slopes inwardly and downwardly from an outer side edge to an inner side edge.

20. In an over the highway conventional truck or tractor an improved air intake system comprising:

a) a pivotally mounted engine hood having a top and two side portions, the hood portions defining an inverted squared "u" configuration in transverse cross section, the hood being pivotal between closed and engine access positions;

b) one of the side portions including a smooth outer surface having a through air intake opening, the opening being defined by a perimetral hood flange extending inwardly from the outer surface;

c) a self securing grating secured in the opening and including flange and skirt recess portions defining a perimetral gasket recess;

d) a gasket in the recess and in engagement with the hood flange, the gasket providing an endless water seal around the opening;

e) the grating having outermost surfaces disposed essentially in an imaginary extension of a contour generated by said side portion outer surface;

f) the grating having baffle portions each having spaced ends connected to one of the recess portions. the baffle portions delineating air intake passages therebetween; and.

g) structure delineating an air flow and water separation passage extending from the intake passages to an engine;

h) the separable parts including a flexible tubular boot of corrugated configuration; and.

i) a cage mounted in an outlet opening of the boot.

* * * * *

(12) EX PARTE REEXAMINATION CERTIFICATE (5676th)
United States Patent
Stosel et al.

(10) Number: US 5,794,733 C1
(45) Certificate Issued: Feb. 20, 2007

(54) VEHICLE AIR INTAKE AND METHOD

(75) Inventors: Dennis E. Stosel, Kernersville, NC (US); Thomas J. Palenchar, Greensboro, NC (US)

(73) Assignee: Volvo Trucks North America, Inc., Greensboro, NC (US)

Reexamination Request:
No. 90/007,473, Mar. 21, 2005

Reexamination Certificate for:
Patent No.: 5,794,733
Issued: Aug. 18, 1998
Appl. No.: 08/698,853
Filed: Aug. 16, 1996

(51) Int. Cl.
*F02M 35/00* (2006.01)
*F02M 35/16* (2006.01)
*B60K 13/00* (2006.01)
*B60K 13/02* (2006.01)
*B60K 11/08* (2006.01)
*B60K 11/00* (2006.01)
*F02B 29/00* (2006.01)
*F02B 29/04* (2006.01)

(52) U.S. Cl. .................. 180/68.1; 180/68.3; 180/69.25
(58) Field of Classification Search ............... None
See application file for complete search history.

(56) References Cited

U.S. PATENT DOCUMENTS

| 3,232,368 A | * | 2/1966 | Sullivan | 180/68.3 |
| 4,575,128 A | * | 3/1986 | Sundquist | 285/9.2 |
| 4,689,060 A | * | 8/1987 | Koske | 55/385.3 |
| 4,699,639 A | * | 10/1987 | Gieseke et al. | 55/385.3 |
| 5,022,479 A | * | 6/1991 | Kiser et al. | 180/68.3 |
| 5,042,603 A | * | 8/1991 | Olson | 180/68.3 |
| 5,579,858 A | * | 12/1996 | Petersen et al. | 180/68.3 |
| 5,618,323 A | * | 4/1997 | Shearn et al. | 180/68.3 |

* cited by examiner

*Primary Examiner*—Peter C. English

(57) ABSTRACT

An over the highway truck or tractor vehicle with an improved air intake system. The vehicle includes a hood and fender assembly with a smooth outer surface with an air intake opening in the passenger side of the hood. The intake is defined by a perimetral hood flange extending inwardly from the outer surface. A self securing grating is in the opening. The grating has a perimetral gasket recess which traps a gasket in engagement with the hood flange to provide water seal around the opening. The grating has baffle portions which delineate air intake passages. Structure within the hood delineates an air flow and water separation passage extending from the intake passages to an engine. The flow and separation passage includes a plenum section adjacent the grating and a choke section above the plenum section.

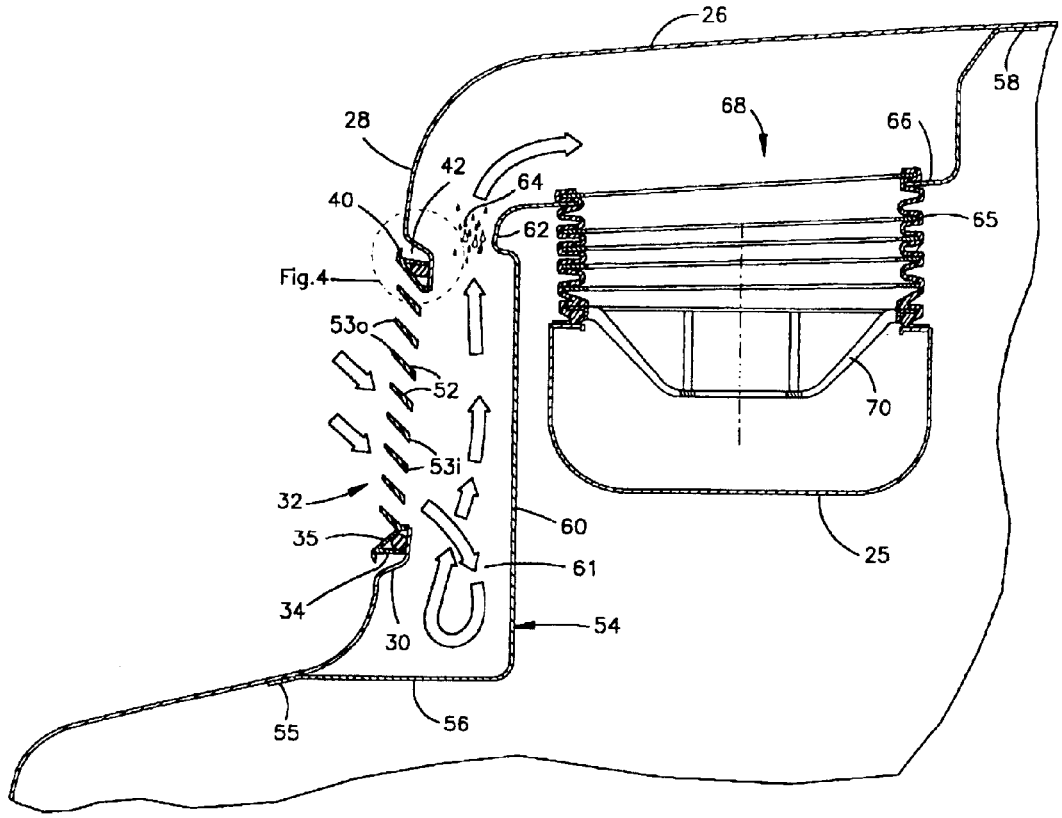

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15 and 17–20 is confirmed.

Claim 16 is determined to be patentable as amended.

New claims 21–25 are added and determined to be patentable.

16. In a conventional over the highway truck or tractor vehicle having a forwardly located engine and hood, an improved engine air intake system comprising:
   a) the hood having a generally vertical side portion defining an air inlet;
   b) an apertured grating secured to the hood and positioned in the inlet, *said grating including means for directing air flowing from the inlet generally downwardly*;
   c) *a first structure including* a flow diverting wall mounted within the hood and positioned in a generally vertical orientation when the vehicle is in use, *said first structure for inducing generally turbulent conditions in an air flow path from the inlet, thereby urging water from the air*;
   d) the wall being spaced from and generally parallel to the inlet to define a part of a relatively large initial portion of [an] *the* air flow path from the inlet to the engine and to divert upwardly air flowing inwardly from the inlet;
   e) *a second* structure providing a conduit delineating a portion of the path, the conduit communicating the initial portion with the engine; and,
   f) other structure delineating a water collection and disposal trough beneath the initial portion of the path.

21. *The system of claim 16, wherein said means for directing the air flow downwardly includes baffles.*

22. *The system of claim 16, wherein said inlet is delineated by an inturned flange.*

23. *In a conventional over the highway truck or tractor vehicle having a forwardly located engine and hood, an improved engine air intake system comprising:*
   a) *the hood having a generally vertical side portion defining an air inlet;*
   b) *an apertured grating secured to the hood and positioned in the inlet, said grating including baffles directing air flowing from the inlet generally downwardly;*
   c) *a flow diverting wall mounted within the hood and positioned in a generally vertical orientation when the vehicle is in use;*
   d) *the wall being spaced from and generally parallel to the inlet to define a part of a relatively large initial portion of an air flow path from the inlet to the engine and to divert upwardly air flowing inwardly from the inlet;*
   e) *structure providing a conduit delineating a portion of the path, the conduit communicating the initial portion with the engine; and,*
   f) *other structure delineating a water collection and disposal trough beneath the initial portion of the path.*

24. *The system of claim 23, wherein said inlet is delineated by an inturned flange.*

25. *The system of claim 23, wherein water entrained in the downwardly directed air tends to strike the flow diverting wall and flow downwardly.*

* * * * *